(12) United States Patent
Kobayashi

(10) Patent No.: US 6,252,836 B1
(45) Date of Patent: Jun. 26, 2001

(54) TRACKING CONTROL METHOD AND APPARATUS, RECORDING/REPRODUCING APPARATUS AND OPTICAL DISC

(75) Inventor: Shoei Kobayashi, Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/208,129

(22) Filed: Dec. 9, 1998

(30) Foreign Application Priority Data

Dec. 12, 1997 (JP) .................................................. 9-343439

(51) Int. Cl.⁷ ........................................................ G11B 7/00
(52) U.S. Cl. ............................................................ 369/44.34
(58) Field of Search ............................ 369/47, 48, 275.3, 369/275.4, 44.34, 44.25, 44.26, 44.27, 53.28, 47.36, 47.49, 47.54

(56) References Cited

U.S. PATENT DOCUMENTS 5,754,522 * 5/1998 Kobayashi et al. ........... 369/275.4 X
6,058,099 * 5/2000 Senshu ............................... 369/275.3

* cited by examiner

Primary Examiner—Paul W. Huber
(74) Attorney, Agent, or Firm—Frommer Lawrence & Haug, LLP.; William S. Frommer; Darren M. Simon

(57) ABSTRACT

A tracking control method and apparatus wherein an offset generated in the push-pull signals is removed to realize correct tracking. In an address area AR1, a pit-shaped groove GR1 is formed between a wobbling groove GR and a groove header GRH on a line of extension of the wobbling land. That is, the groove GR1 is surrounded by two neighboring lands. On the other hand, a land X of the address area AR1 lying on a line of extension of the groove GR and on a sector boundary is surrounded by two neighboring pit-shaped grooves GR1.

6 Claims, 14 Drawing Sheets

TRACKING CONTROL METHOD AND APPARATUS, RECORDING/REPRODUCING APPARATUS AND OPTICAL DISC

BACKGROUND OF THE INVENTION

1. Field of the Invention

This invention relates to a tracking controlling method and apparatus employing push-pull signals, a recording/reproducing apparatus, and an optical disc.

2. Description of the Related Art

Nowadays, research and development of an optical disc recording/reproducing apparatus, configured for reproducing data recorded on the optical disc or recording data on the optical disc, are proceeding briskly. With such recording/reproducing apparatus, tracking servo is applied using a one-beam push-pull method or a three-beam method. In view of the increasing capacity and recording density of the optical disc, LD laser power or adjustment capability of the optical system, it is desirable to apply tracking servo by the push-pull method.

In the optical disc recording/reproducing apparatus, employing the push-pull method, an output light difference of two photodetectors arranged symmetrically with respect to the track center, that is the output difference between light beams reflected and diffracted by a groove in the optical disc, is detected as a push-pull signal. Tracking servo is applied to, for example, a biaxial actuator, with this push-pull signal as a tracking error.

However, since the optical disc is rotated with a sizeable offset, the light beam spot is moved on the photodetector adapted for detecting the push-pull signal, so that an offset is produced in the push-pull signal, that is the tracking error signal, and hence high tracking accuracy cannot be achieved.

If assumed that the rotating optical disc is not subjected to offset, the reflected laser light is illuminated on the center of a photodetector 50, as shown in FIG. 1A. However, if the rotating optical disc is subjected to offset, the reflected laser light is illuminated at a position offset from the center of the optical disc in dependence upon the disc offset, as shown in FIGS. 1B, 1C and 1D. This produces the dc offset in the push-pull signal. The push-pull signal obtained by the reflected light from the groove is offset relative to an ideal push-pull signal indicated by a broken line in FIG. 2A.

In an optical disc designed to record data on both the land and the groove, offset in the push-pull signal occurs at both the land and the groove, in which case the push-pull signals obtained by the reflected light from the land is subjected to offset from the ideal push-pull signal indicated by a broken line shown in FIG. 2B.

If an offset is produced in the push-pull signal in this manner, correct tracking cannot be realized. Since the interstice between the land and the groove is continually being narrowed to keep up with the increased capacity and recording density of the optical disc, it is desired to achieve more accurate tracking.

SUMMARY OF THE INVENTION

It is therefore an object of the present invention to provide a tracking controlling method and apparatus employing push-pull signals, a recording/reproducing apparatus and an optical disc whereby an offset produced in the push-pull signals is removed to achieve accurate tracking.

In one aspect, the present invention provides a tracking control apparatus includes push-pull signal generating means for generating push-pull signals from a detection output obtained by an optical head from an optical disc, formed in terms of a sector made up of an address area and a user area, as a unit, with the user area having a meandering groove and a correspondingly meandering land, formed therein, a pit-shaped groove being formed in the address area on a line of extension of the land, the pit-shaped groove being adjacent to another pit-shaped groove formed on a line of extension of another land, with the optical head being adapted to illuminate a light beam on the groove or land to detect its reflected light, pulse generating means for generating a first sample-holding pulse when the light beam is illuminated on the pit-shaped groove or the land surrounded by two such pit-shaped grooves, first sample-holding means for sample-holding push-pull signals generated by the push-pull signal generating means, in synchronism with the first sample-holding pulses, and for holding the push-pull signals for one sector period, difference detection means for detecting the difference between the push-pull signals outputted by the sample-holding means and the push-pull signals generated by the push-pull signal generating means, and tracking control means for controlling the tracking of the optical head based on the push-pull signals obtained by the difference detection means.

In the above tracking controlling apparatus, the first sample-holding pulses are generated when the light beam is illuminated on the pit-shaped groove or on the land surrounded by two such neighboring pit-shaped grooves. The push-pull signals are sample-held in synchronism with the first sample-holding pulses to hold the push-pull signals for one sector period. The difference between the sample-held push-pull signals and the original push-pull signals is detected. The optical pickup is tracking-controlled on the basis of the detected difference output.

In another aspect, the present invention provides a tracking control method including generating push-pull signals from a detection output obtained by an optical head from an optical disc, the optical disc being formed in terms of a sector, made up of an address area and a user area, as a unit, the user area having a meandering groove and a correspondingly meandering land, formed therein, a pit-shaped groove being formed in the address area on a line of extension of the land, with the pit-shaped groove being adjacent to another pit-shaped groove formed on a line of extension of another land, the optical head being adapted to illuminate a light beam on the groove or land to detect its reflected light, generating a first sample-holding pulse when the light beam is illuminated on the pit-shaped groove or the land surrounded by two such pit-shaped grooves, sample-holding push-pull signals in synchronism with the first sample-holding pulses, holding the push-pull signals for one sector period, detecting the difference between the held push-pull signals and the generated push-pull signals, and controlling the tracking of the optical head based on the push-pull signals detected as to difference.

In the above tracking controlling method, the first sample-holding pulses are generated when the light beam is illuminated on the pit-shaped groove or on the land surrounded by two such neighboring pit-shaped grooves. The push-pull signals are sample-held in synchronism with the first sample-holding pulses to hold the push-pull signals for one sector period. The difference between the sample-held push-pull signals and the original push-pull signals is detected. The optical pickup is tracking-controlled on the basis of the detected difference output.

In still another aspect, the present invention provides a recording/reproducing apparatus including push-pull signal generating means for generating push-pull signals from a detection output obtained by an optical head from an optical disc, the optical disc being formed in terms of a sector, made up of an address area and a user area, as a unit, the user area having a meandering groove and a correspondingly meandering land, formed therein, a pit-shaped groove being formed in the address area on a line of extension of the land, the pit-shaped groove being adjacent to another pit-shaped groove formed on a line of extension of another land, the optical head being adapted to illuminate a light beam on the groove or land to detect its reflected light, pulse generating means for generating a first sample-holding pulse when the light beam is illuminated on the pit-shaped groove or the land surrounded by two such pit-shaped grooves, first sample-holding means for sample-holding push-pull signals generated by the push-pull signal generating means in synchronism with the first sample-holding pulses and for holding the push-pull signals for one sector period, difference detection means for detecting the difference between the push-pull signals outputted by the sample-holding means and the push-pull signals generated by the push-pull signal generating means, tracking control means for controlling the tracking of the optical head based on the push-pull signals obtained by the difference detection means, and recording/reproducing means for recording data on the optical disc and/or reproducing data recorded on the optical disc.

In the above recording/reproducing apparatus, the first sample-holding pulses are generated when the light beam is illuminated on the pit-shaped groove or on the land surrounded by two such neighboring pit-shaped grooves. The push-pull signals are sample-held in synchronism with the first sample-holding pulses to hold the push-pull signals for one sector period. The difference between the sample-held push-pull signals and the original push-pull signals is detected. Based on the detected difference output, the optical pickup is tracking-controlled as data is recorded or reproduced for the optical disc.

In yet another aspect, the present invention provides an optical disc having its data recording surface split into plural radial areas to form a plurality of sectors, each of the sectors being allocated to an address area and a user area, there being formed embossed pits of a groove header and embossed pits of a land header in the address area, there being formed a meandering groove and a correspondingly meandering land in the user area and there being formed a pit-shaped groove on a line of extension of the land in the address area, with the pit-shaped groove neighboring to another pit-shaped groove formed on a line of extension of another land.

In the tracking control method and apparatus according to the present invention, as described above, in which the first sample-holding pulses are generated when the light beam is illuminated on the pit-shaped groove or on the land surrounded by two such neighboring pit-shaped grooves, the push-pull signals are sample-held in synchronism with the first sample-holding pulses to hold the push-pull signals for one sector period, the difference between the sample-held push-pull signals and the original push-pull signals is detected and the optical head is tracking-controlled on the basis of the detected difference, correct push-pull signals can be obtained to perform tracking even if dc offset is produced in the push-pull signals.

In the recording/reproducing apparatus according to the present invention, as described above, in which the first sample-holding pulses are generated when the light beam is illuminated on the pit-shaped groove or on the land surrounded by two such neighboring pit-shaped grooves, the push-pull signals are sample-held in synchronism with the first sample-holding pulses to hold the push-pull signals for one sector period, the difference between the sample-held push-pull signals and the original push-pull signals is detected, and data is recorded/reproduced as the optical head is tracking-controlled, the data can be recorded or reproduced under correct tracking even if dc offset is produced in the push-pull signals.

In the optical disc according to the present invention, in which, in its address area, a pit-shaped groove is formed on a line of extension of the land, with the pit-shaped groove lying adjacent to a pit-shaped groove formed on a line of extension of another land, to provide an area for detecting the dc offset component of the push-pull signals to remove the dc offset from the push-pull signals.

DESCRIPTION OF THE PREFERRED EMBODIMENTS

Figure 1A:
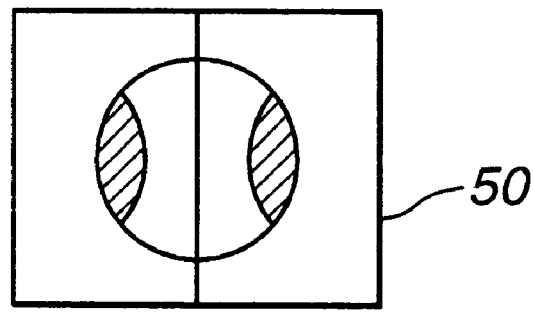
FIGS. 1A, 1B, 1C and 1D illustrate the reflected light of a conventional light beam illuminated on a photodetector.
Figure 1B:
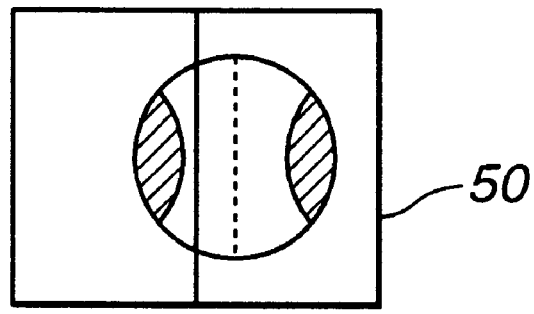
Figure 1C:
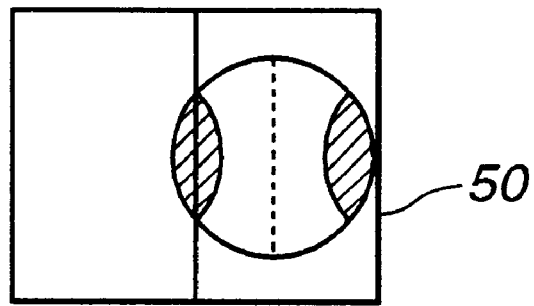
Figure 1D:
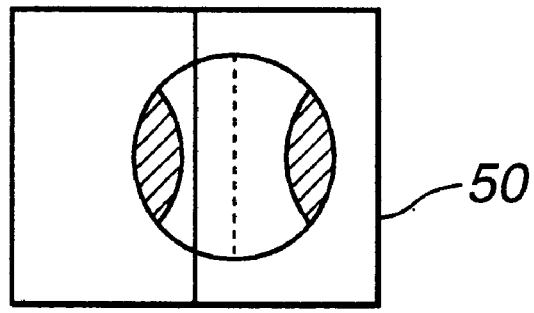
Figure 2A:
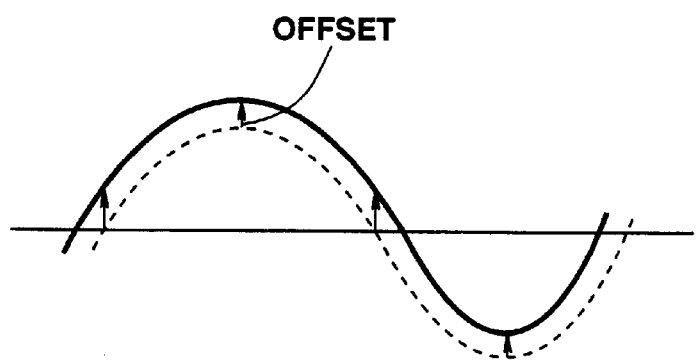
FIGS. 2A and 2B illustrate the status the push-pull signal is subjected to offset.
Figure 2B:
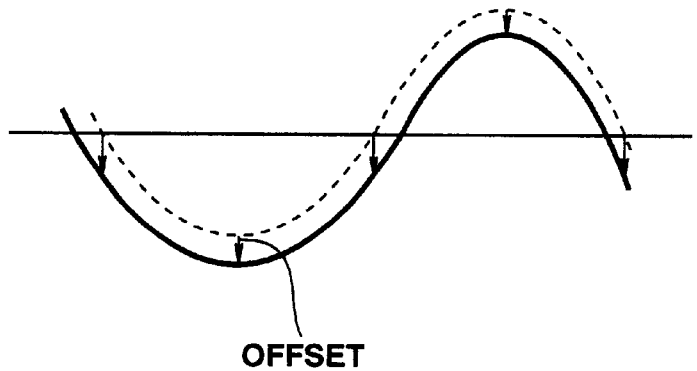

Referring to the drawings, preferred embodiments of the present invention will be explained in detail.

Figure 3:
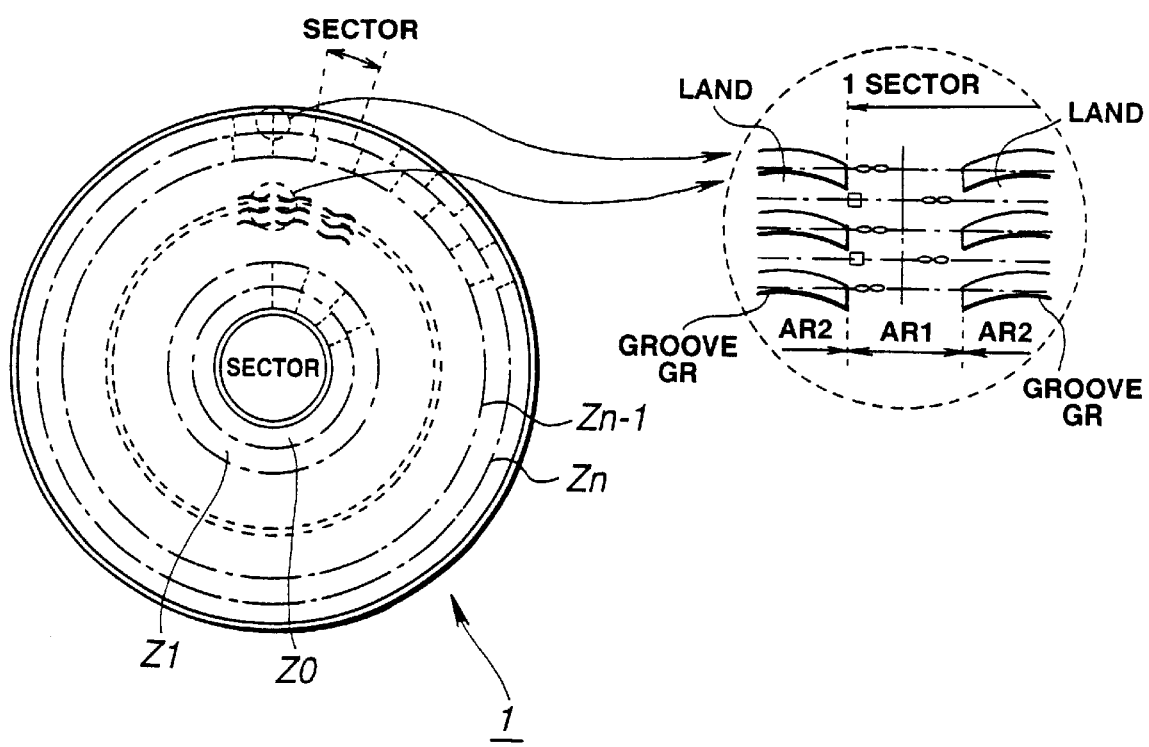
FIG. 3 shows a structure of an optical disc embodying the present invention.

An optical disc according to the present invention can be applied to an optical disc 1 configured as shown for example in FIG. 3.

The optical disc 1 has its data recording surface split into plural radial areas to provide a sector structure, while having its data recording surface split into plural concentric circles to form plural zones Z0 to Zn.

Each sector has its leading portion allocated to an address area AR1 in which to write addresses, while having the remaining succeeding area allocated to a user area AR2 in which to write data. In the user area AR2, a groove GR is formed in a meandering manner. In a track of an innermost zone Z0, the groove GR is formed in a meandering manner over a pre-set number of periods, with the number of times of meandering sequentially increasing in a direction towards the outer rim side zone. The address areas AR1 are arrayed discretely on the optical disc for recording the address information on the sector basis. To this address area AR1 is allocated a length equivalent to a pre-set number of periods of the groove GR.

Figure 4:
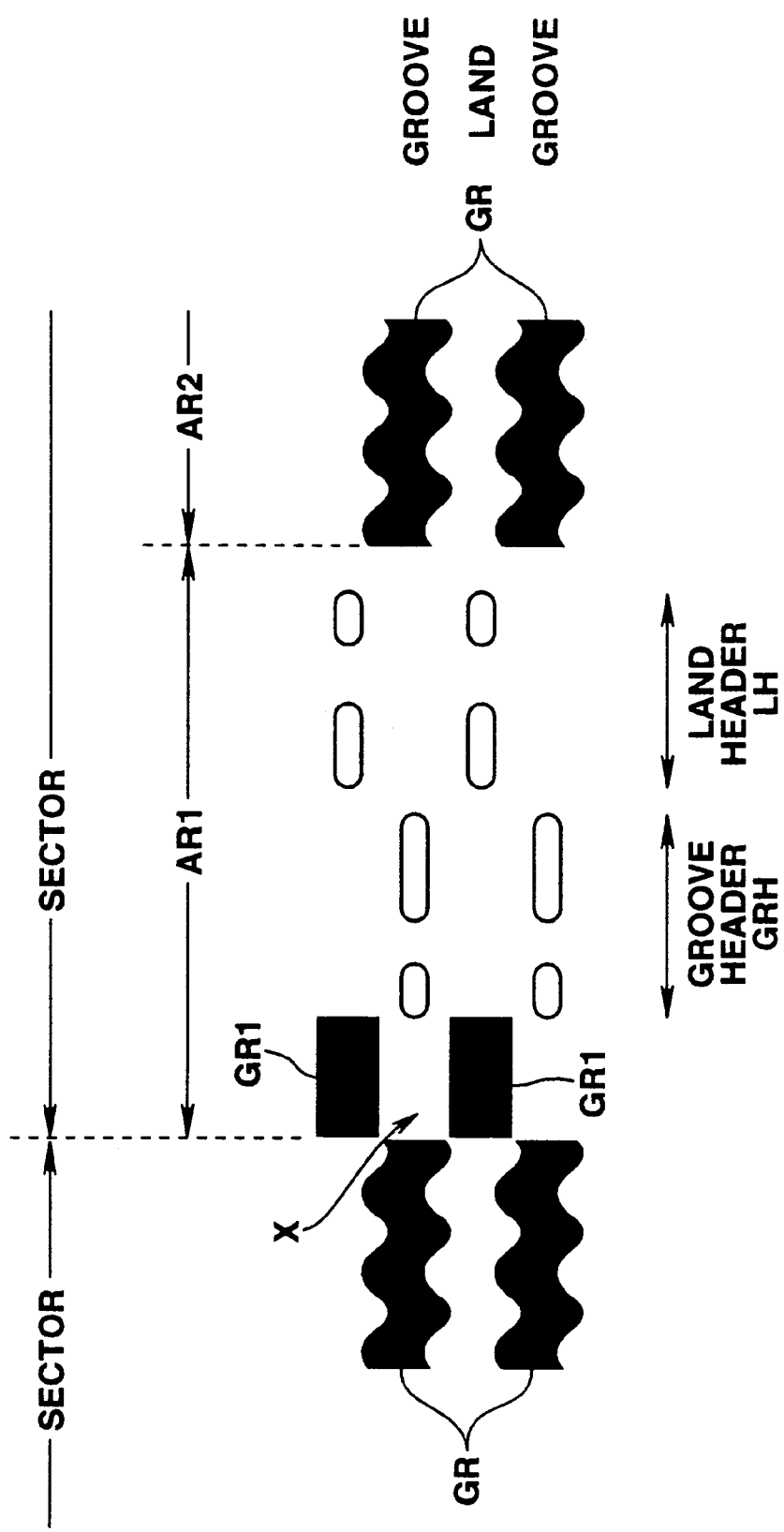
FIG. 4 shows the structure of an address area and a user area of the optical disc shown in FIG. 3.

In the former half of the address area AR1, embossed pit strings of the groove header GRH by the groove GR are formed, as shown in FIG. 4. In the latter half of the address area AR1, embossed pit strings of a land header LH are formed on the track center delimited by the land.

In the address area AR1, a pit-shaped groove GR1 is formed between the wobbling groove GR and the groove header GRH on a line of extension of the wobbling land. That is, the groove GR1 is sandwiched between neighboring lands. On the other hand, a land X of the address area AR1 lying on a line of extension of the groove GR on the sector boundary is surrounded by two pit-shaped grooves GR1.

This pit-shaped groove GR1 is used to detect a dc offset produced in the push-pull signal. By detecting the push-pull signal when the laser light beam is illuminated on the pit-shaped groove GR1, it is possible to detect the dc offset of the push-pull signals at the time of illumination of the laser light beam on the land of the user area AR2.

Similarly, the land X surrounded by the groove GR1 also is used to detect the dc offset produced in the push-pull signal. By detecting the push-pull signal generated on illuminating the land B surrounded by the pit-shaped grooves GR1, it is possible to detect the dc offset of the push-pull signals when the light beam is illuminating the groove of the user area AR2.

Figure 5:
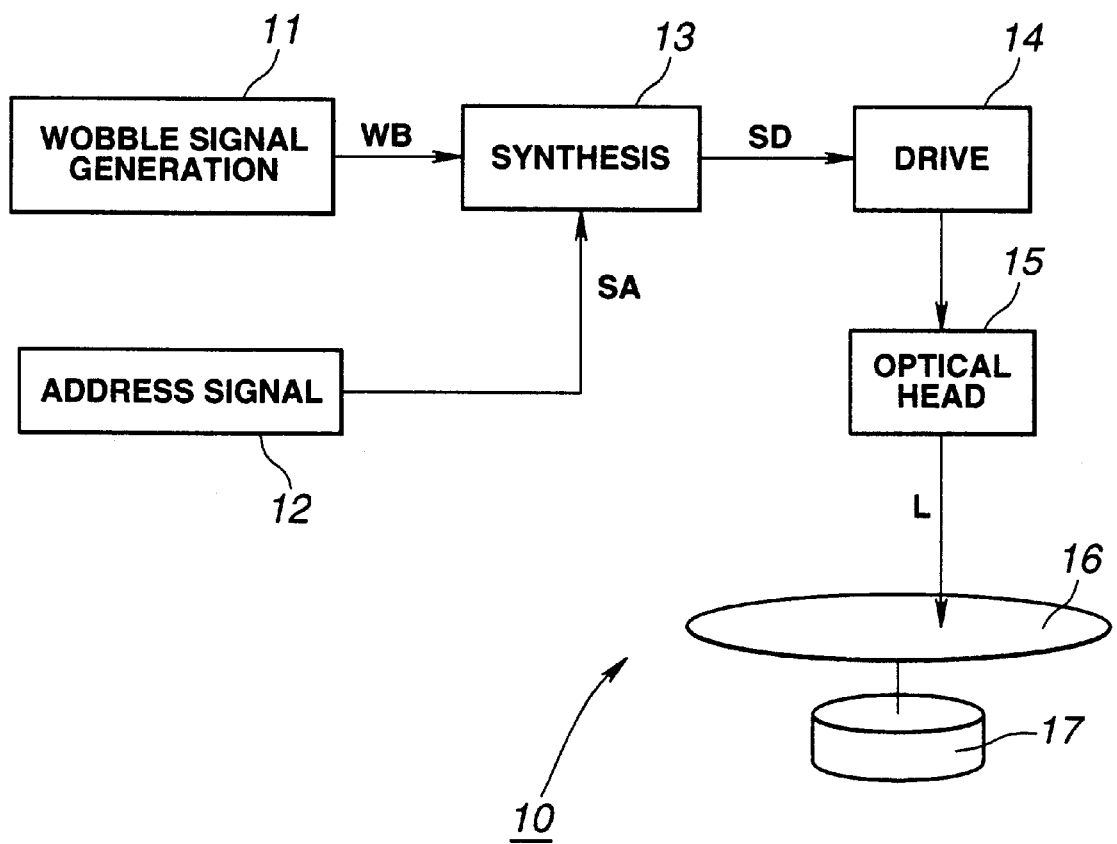
FIG. 5 is a block diagram showing the structure of a mastering device used for producing the optical disc.

The optical disc 1 is fabricated by exposing a master disc by a mastering device 10 configured as shown in FIG. 5.

The mastering device 10 includes a synthesis circuit 13 for synthesizing signals from a wobbled signal generating circuit 11 and an address signal generating circuit 12, a driving circuit 14 for driving an optical head 15 based on the driving signals SD, a spindle motor 17 for rotationally driving a master disc 16 and a system control circuit, not shown.

The wobbled signal generating circuit 11 generates sine wave signals of a pre-set frequency, synchronized with rotation of the master disc 16, as wobbling signals WB. The wobbling signal generating circuit 11 also progressively increases the frequency of the wobbling signals WB in association with zoning. This wobbling signal generating circuit 11 displaces the light beam illuminating position by these wobbling signals WB to cause meandering of the groove GR over a pre-set number of periods per sector.

The address signal generating circuit 12 generates an address signal SA, sequentially changed in value with displacement of the optical head 15, under control by a system control circuit not shown.

Specifically, the address signal generating circuit 12 receives timing signals, comprised of FG signals etc synchronized with rotation of the master disc 16, from the spindle motor 17, and counts the timing signals by a pre-set counter, to generate address data ID specifying the light beam illuminating position. The address signal generating circuit 12 appends a sector mark SM, timing data for synchronization VFO, an address mark AM and a post-amble PA to the address data ID to generate a group header and a land header allocated to the former and latter halves of the address area AR1. The groove GR1 is formed at a timing between the wobbled groove GR and the groove header GRH. Also, timing signals are generated so that pit-shaped grooves will be generated in one of the former, latter or intermediate portions of the address area AR1. The timing data for synchronization VFO is the same clock pattern as the clock pattern recorded/reproduced as timing data for synchronization VFO at a leading portion of the user area AR2. The address signal generating circuit 12 converts the generated sector header into a data of serial data which is modulated in accordance with a predetermined format.

The address signal generating circuit 12 sends the modulated output as address signal SA to the synthesis circuit 13. The address signal generating circuit 12 outputs the address signal SA at a timing corresponding to scanning of the light beam L from the optical head 15.

The driving circuit 14 switches the driving conditions for the optical head 15, at a timing synchronized with rotation of the master disc 16, depending on the light beam illuminating position, to effectuate zoning of the master disc 16. Specifically, the driving circuit 14 switches the driving conditions for the optical head 15 to split the data recording surface of the master disc 16 into plural radial zones to form a sector structure. In addition, the switching timing is changed stepwise from the inner rim towards the outer rim to split the data recording surface into plural concentric circles to form plural zones Z0 to Zn.

The driving circuit 14 also displaces the light beam illuminating position by the driving signal SD in the user area AR2, under control by the system control circuit, thereby forming a meandering groove GR in the user area AR2.

In the former half portion of the address area AR1, displacement of the light beam illuminating position is discontinued and the light volume of the light beam is intermittently raised by the driving signal SD to form a pit string on the track center defined by the groove GR. Also, in the latter half portion of the address area AR1, the light beam illuminating position is displaced onto the track center by the inner land and the light volume of the light beam is intermittently raised by the driving signal SD to form a pit string on the track center by the land.

The driving circuit 14 records address data of a sector formed by the next following groove GR on the track center by a pit string in the former half portion of the address area AR1, while recording address data of a sector formed by the next following inner rim side land on the track center by a pit string in the latter half portion of the address area AR1.

The optical head 15 is configured for moving the optical system radially of the master disc 16. In the optical head, the spot diameter of the light beam L is set so that, when the optical disc is fabricated from the master disc 16, the width of the groove GR formed by light exposure by the light beam L will be approximately equal to the width of the land between the above groove GR and an adjoining groove GR. The spot shape and the light volume of the light beam L are set so that the effective range of light exposure by the light beam L will be increased relative to the width of the groove GR as an ultimate target. Thus, the optical head 15 exposes the master disc 16 to light so that an optical disc fabricated from the master disc 16 will be able to record data in the area between its land and groove GR.

On the surface of, for example, a glass substrate of the master disc 16 is coated a resist. The master disc 16 is run in rotation by the spindle motor 17 at a constant angular velocity. The optical head 16 illuminates a light beam L on the master disc 16 as it is sequentially moved from the inner rim towards the outer rim of the master disc 16 by a predetermined threading unit in synchronism with rotation of the master disc 16. Thus, the optical head 16 forms a spirally extending track from the inner rim towards the outer rim of the master disc 16.

By the above processing, the mastering device 10 is able to produce the above-described optical disc 1 by illuminating the light beam L on the master disc 16.

Figure 6:
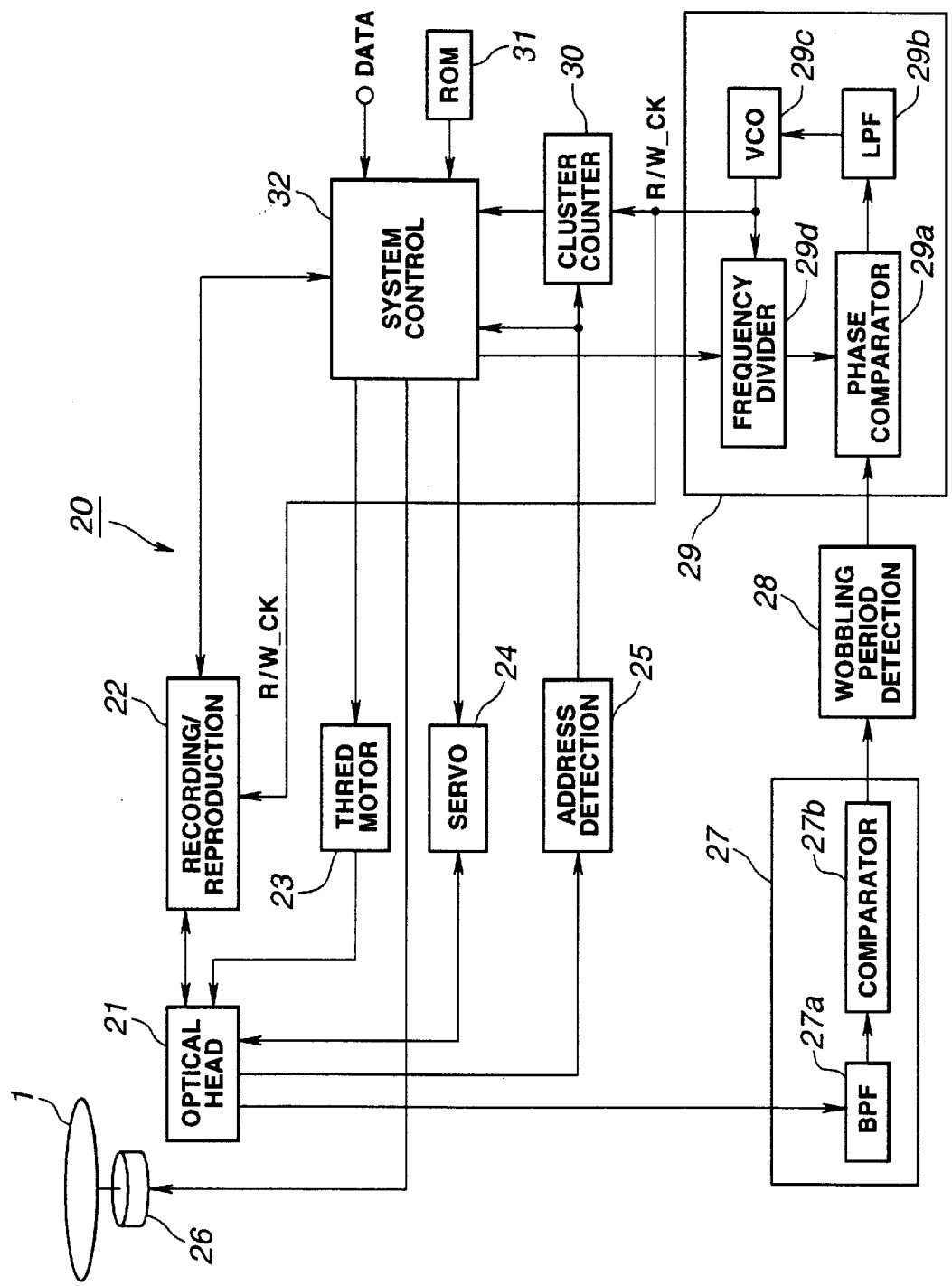
FIG. 6 is a block diagram showing the structure of a recording/reproducing apparatus for the optical disc.

Referring to FIG. 6, a recording/reproducing apparatus 20 for recording data or reproducing data for the optical disc 1 is explained.

The recording/reproducing apparatus 20 includes an optical head 21 for recording/reproducing data by a light beam, a recording/reproducing circuit 22 for converting data into data of a predetermined format, a threading motor 23 for moving the optical head 21 radially of the optical disc, a servo circuit 24, an address detection circuit 25 for detecting addresses of data being read out from the optical disc and a spindle motor 26 for rotationally driving the optical disc.

The optical disc 21 records data furnished from a system control circuit 32 and the recording/reproducing circuit 22, as later explained, by a light beam on the optical disc 1. The recording/reproducing 22 converts data sent from the system control circuit 32 into data of a predetermined format to send the resulting data to the optical head 21.

Figure 7:
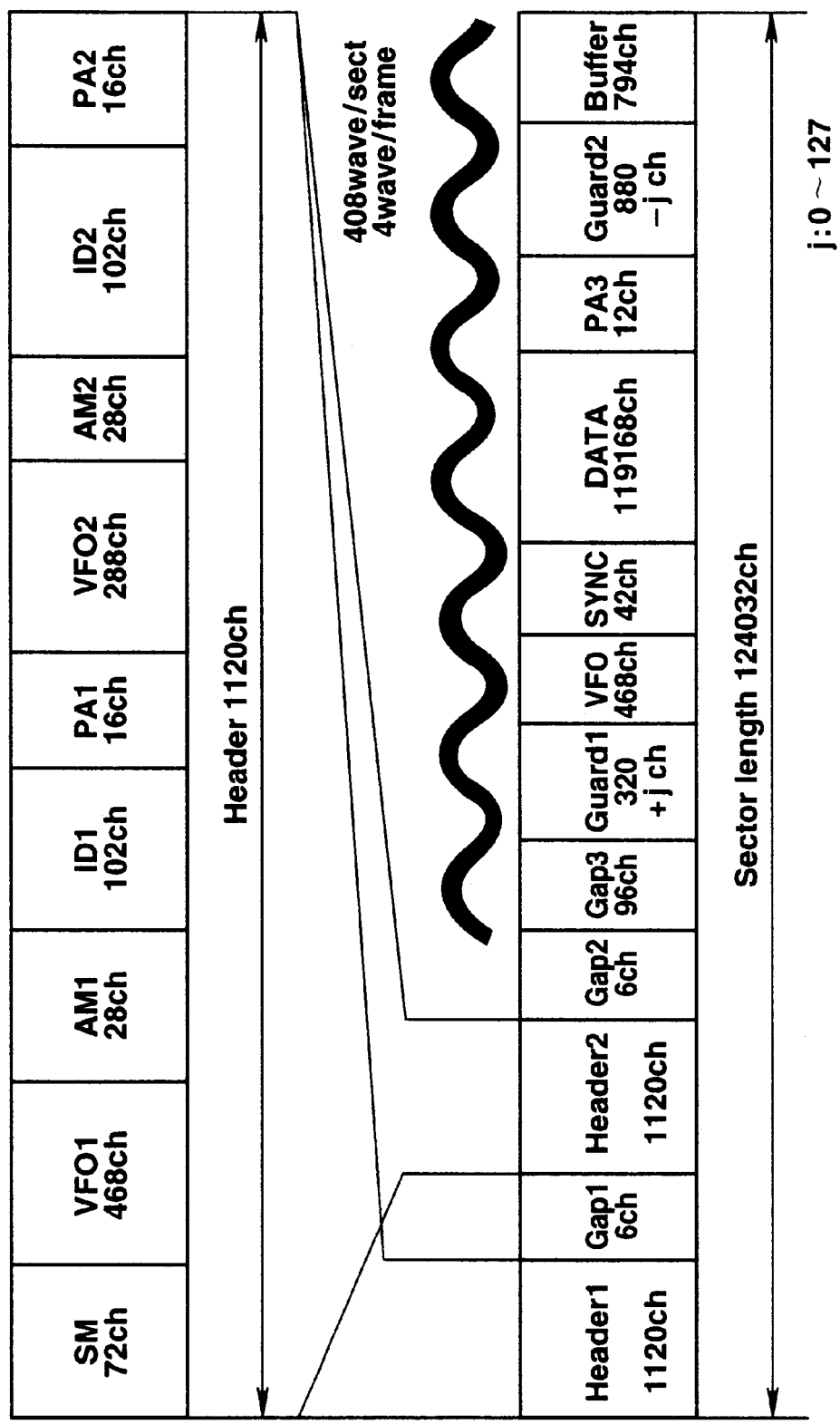
FIG. 7 illustrates the structure of sectors recorded on the optical disc.

The recording/reproducing circuit 22 converts the data into sector-based data shown for example in FIG. 7 to record the converted data on the optical disc 1 via optical head 21. Each sector is constituted by a header area formed by embossed pits and an 8k byte recording/reproducing area.

The header is made up of sector marks (SMs), timing data for synchronization VFO1, VFO2, address marks (AM1, AM2), ID1, ID2 and post-ambles (PA1, PA2). A header 1 and a header 2 are formed in the groove and land, respectively. The gaps (Gap1, Gap2, Gap3) are used as guard areas for recording start and for recording end, respectively. This guard area, having a predetermined length, causes the position of the recording data to be moved by j_ch for each recording event. This eliminates the necessity of using data for recording start and recording termination such that data is not affected by recording deterioration of identification of the recording start and recording end positions by overwriting. Also, the number of times of overwriting can be improved by moving the recording data position for each recording event. The VFO is the PLO pull-in area for recording data. SYNC and Buffer denote a data start position and an area for absorbing the effect of jitter, such as offset, respectively. The groove is designed to have 408 periods of meandering per sector.

Figure 8:
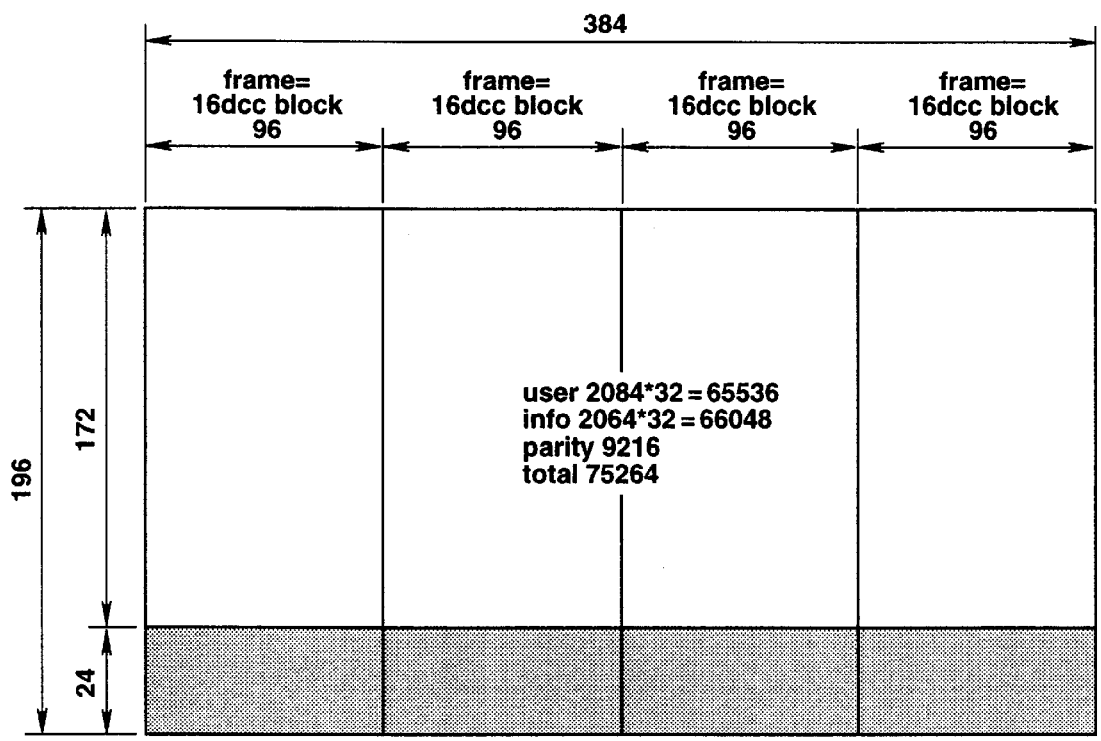
FIG. 8 illustrates the structure of an ECC block recorded on the optical disc.

An error correction block is made up of 64 Kbytes, as shown in FIG. 8. It can also be handled as a recording/reproducing 2k data sector. In such case, an error correction block is recorded or reproduced in terms of 64 Kbytes as a unit. Of the 64 Kbyte block, desired 2k byte data is recorded or reproduced. Specifically, a 24 byte parity is appended to 172-byte data. The interleaving length is 384 bytes.

Figure 9:
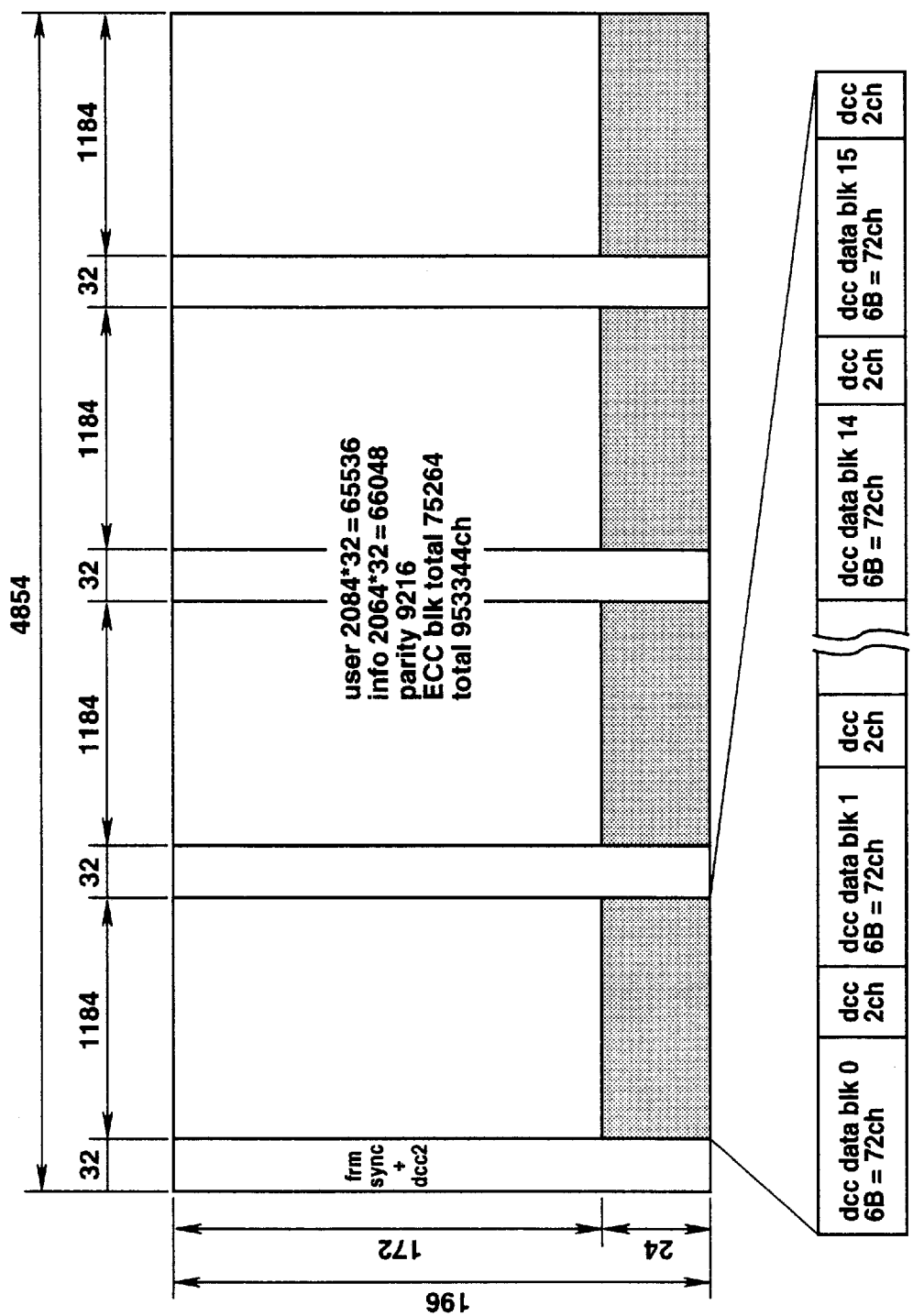
FIG. 9 illustrates the structure of a frame recorded on the optical disc.

FIG. 9 shows a frame structure, in which a frame sync along with the dcc bits is at the leading end of each frame. Frame data is a one-fourth fraction of one interleaving data unit of an error correction block. Each frame is made up of 16 dcc blocks each of which is made up of a one-sixteenth fraction of frame data and dcc.

The optical head 21 sends a detection output of the reflected laser light from the optical disc I to the recording/reproducing circuit 22, servo circuit 24, address detection circuit 25 and a wobbling signal generator 27.

The servo circuit 24 generates focussing error signals from a detection output of the optical head 21 to perform focussing control for the optical head 21 based on these focussing error signals. Also, the servo circuit 24 generates push-pull signals from a detection output of the optical head 21 to execute tracking control for the optical head 21 based on these push-pull signals.

Figure 10:
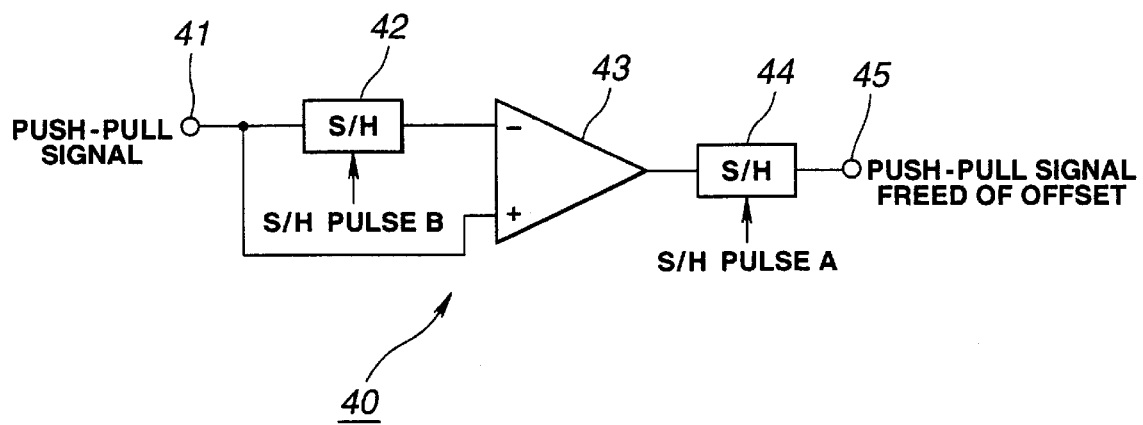
FIG. 10 is a block diagram showing the structure of an offset removing portion of a servo circuit of the recording/reproducing apparatus.

The servo circuit 24, including an offset removal circuit 40 shown in FIG. 10, fed with the push-pull signals. The servo circuit 24 performs tracking control after removing the offset of the push-pull signals.

The offset removal circuit 40 includes a sample-and-hold circuit 42 for sample-holding input push-pull signals from an input terminal 41, a difference detection circuit 43 for detecting a difference of push-pull signals from the input terminal 41 and the sample-and-hold circuit 42 and a sample-and-hold circuit 44 for sample-holding push-pull signals from the difference detection circuit 43. The sample-and-hold circuit 42 performs sample-holding in synchronism with sample-holding pulses (S/H pulses) and has a time constant equal to the time the light beam is moved one sector. The sample-and-hold circuit 44 performs sample-holding in synchronism with S/H pulses A and has a time constant equal to the time the light beam is moved through the address area AR1.

The servo circuit 24 generates S/H pulses A when the light beam is illuminating the groove and when the light beam is positioned at an area A, which is the last position of the user area AR2, while generating S/H pulses B when the light beam traverses the sector boundary and is positioned at the area B which is the initial position of the address area AR1.

The sample-and-hold circuit 42 sample-holds push-pull signals in synchronism with the S/H pulses B to detect a dc offset of the push-pull signals in the area B to hold the detected dc offset for a one-sector period. When the light beam traverses the address area AR1 to enter the user area AR2, the difference detection circuit 43 eliminates the dc offset from the push-pull signals of the user area AR2 to output offset-free push-pull signals.

On the other hand, when the light beam is traversing the address area AR1, the push-pull signals entering the input terminal 41 are made up only of noise components and hence are not normal signals. Thus, the sample-and-hold circuit 44 sample-holds push-pull signals in the area A in synchronism with the S/H pulses A and hence is able to output push-pull signals even in the address area AR1.

As described above, the offset removal circuit 40 detects the offset of the push-pull signals in the address area AR1 of each sector to remove the offset from the push-pull signals in the user area AR2 to produce optimum push-pull signals. This realizes optimum tracking control even if offset is produced in the rotation of the optical disc 1 to produce dc offset in the push-pull signals.

In the address area AR1, the offset removal circuit 40 cannot obtain the normal push-pull signals. Therefore, it sample-holds push-pull signals in the directly previous user area AR2 to obtain the push-pull signals.

In particular, a servo loop is not established in a tracking servo pull-in stage such that tracking in the address area AR1 is not sufficient. Optimum tracking can be realized by sample-holding push-pull signals of the user area AR2 directly previous to the address area AR1.

Figure 11:
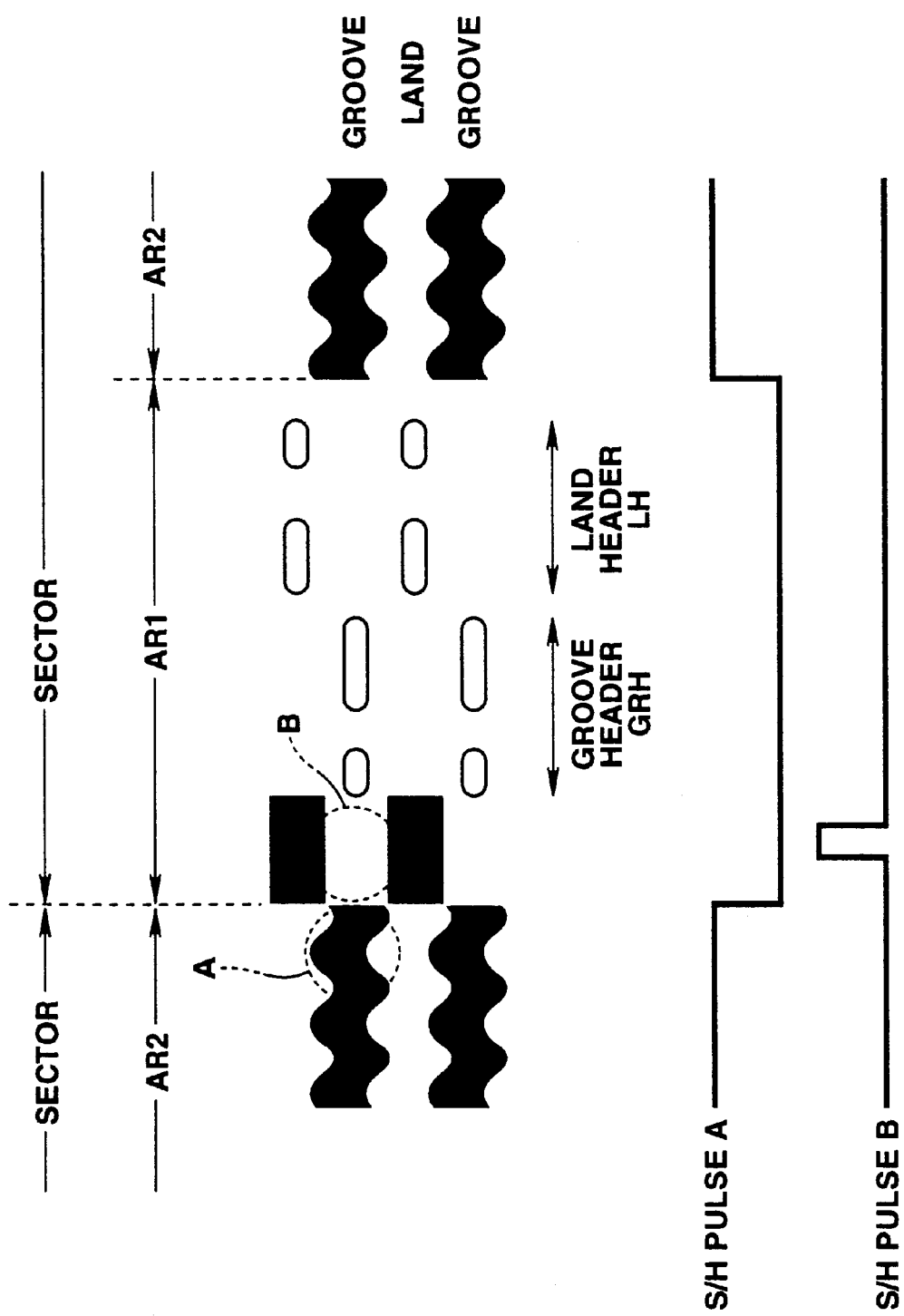
FIG. 11 illustrates the timing of generation of S/H pulses to be sent to the offset removing portion.
Figure 12:
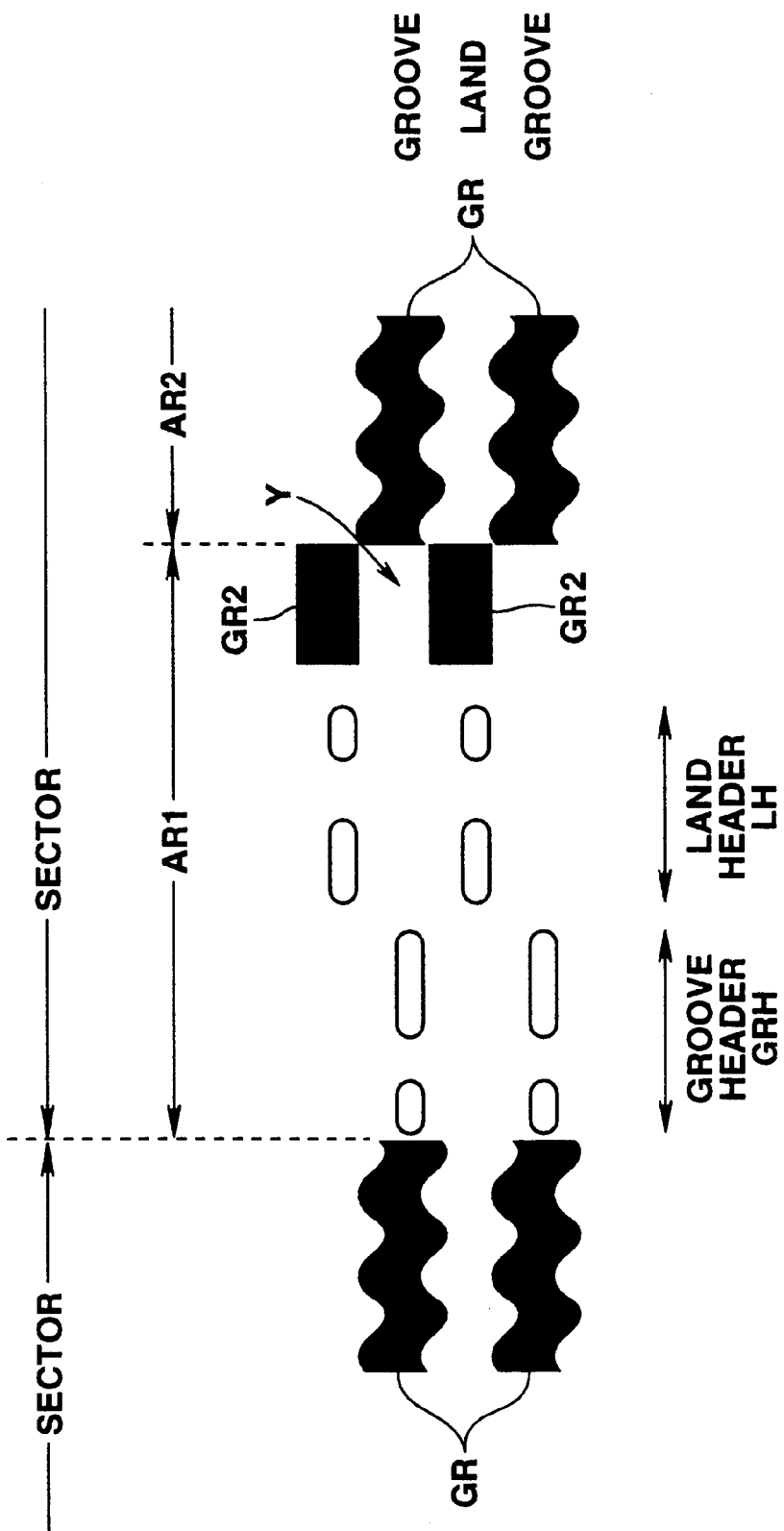
FIG. 12 shows an alternative structure of the address area and the user area of the optical disc.

Even if the light beam illuminates a wobbled land, the offset removal circuit 40 is able to remove the offset generated in the push-pull signals by a similar configuration. It suffices at this time if the servo circuit 24 generates S/H pulses when the light beam illuminates the pit-shaped groove GR1. Meanwhile, the S/H pulses A can be generated as explained with reference to FIG. 11.

On the other hand, the address detection circuit 25 decodes address data from a detection output of the optical head 21 and detects errors to send decoded addresses to the system control circuit 32.

Referring to FIG. 8, the recording/reproducing circuit 20 includes the wobbling signal generator 27, a wobbling period detection circuit 28 for detecting the periods of the wobbling signals, a PLL circuit 29, a cluster counter 30 for counting the address positions, a ROM 31 for storing a predetermined control program, and the system control circuit 32 for controlling the respective circuits.

The wobbling signal generator 27 includes a band-pass filter (BPF) 27a for removing noise components from the wobbling signals and a comparator 27b for performing convert-to-binary processing. The BPF 27a is fed via optical head 21 with a detection output of wobbling of the grooves recorded on the optical disc 1 (wobbling signals). The BPF 27a removes the noise from the wobbling signals to send the resulting signals to the comparator 27b. The comparator 27b performs convert-to-binary processing on the wobbling signals from the BPF 27a to produce wobbling detection pulses which are sent to the wobbling period detection circuit 28.

The wobbling period detection circuit 28 deciphers the periodicity of the wobbling detection pulses and sends the pulses to the PLL circuit 29 if these are of a pre-set periodicity.

The PLL circuit 29 includes a low-pass filter (LPF) 29b for removing high frequency noise components, a voltage-controlled oscillator (VCO) 29c and a frequency divider 29d.

The phase comparator 29a compares the phase of the wobbling detection pulses from the wobbling period detection circuit 28 and that of the pulses from the frequency divider 29d to each other to send a phase comparison error signal indicating the phase error via LPF 29b to the VCO 29c. The VCO 29c generates channel clocks (R/W clocks) based on the phase comparison error signal to send the generated channel clocks to the frequency divider 29d and to the cluster counter 30. The frequency divider 29d has its frequency dividing ratio controlled by the system control circuit 32 and divides the R/W clocks from the VCO 29c to generate pulses of the same frequency as the frequency of the wobbling signals to send the generated pulses to the phase comparator 29a. By the above processing, the R/W clocks are generated on the basis of the above-mentioned wobbling signals.

The cluster counter 30 performs synchronization signal processing, synchronized with the address periods, on the basis of the addresses from the address detection circuit 25 and those from the R/W clocks from the VCO 29c, in order to count the position of the next address. If the cluster counter 30 cannot detect the position of the next address, the position of the next address is determined from this counter to count up the addresses.

Based on the address detected by the cluster counter 30, the system control circuit 32 controls the rotation of the threading motor 23 to cause the optical head 21 to access a predetermined position on the optical disc 21 to record and/or reproduce data in timed relation with the cluster recording/reproducing timing. In the ROM 31 are stored data of the frequency dividing ratio of the frequency divider 29d associated with the addresses. Thus, the system control circuit 32 controls the frequency dividing ratio of the frequency divider 29d based on data of the ROM 31. The system control circuit 32 controls the recording/reproducing circuit 22 to perform preset signal processing on data read out from the optical head 21. The system control circuit 32 also converts input data from outside into data of a pre-set format to record the converted data via optical head 21 on the optical disc 1.

In the above-described embodiment, the pit-shaped groove GR1 is formed on the sector boundary side in the address area AR1, as shown in FIG. 4. This, however, is merely illustrative and is not limiting the invention.

Figure 13:
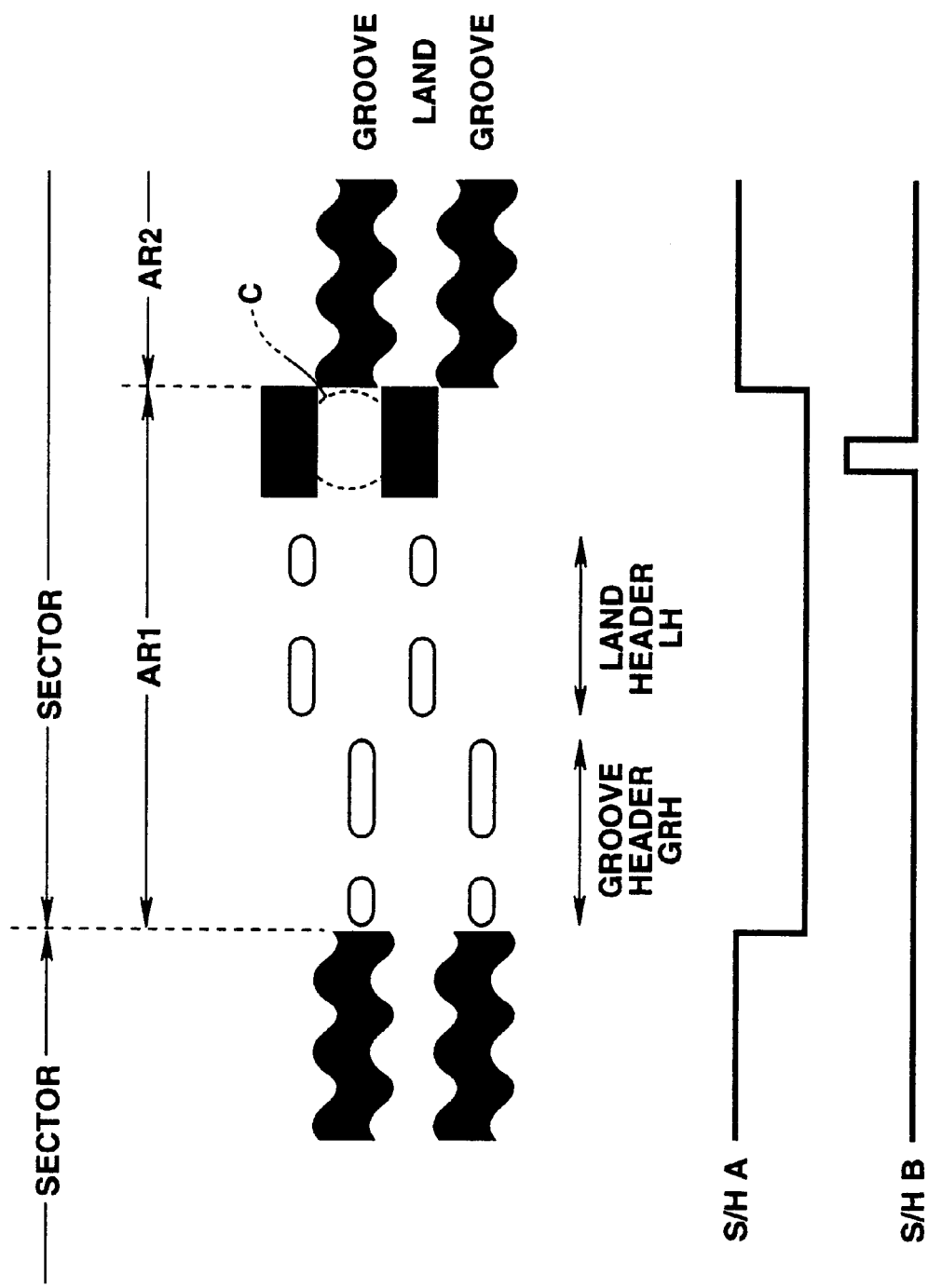
FIG. 13, similarly to FIG. 11, illustrates the timing of generation of S/H pulses to be sent to the offset removing portion.

For example, the pit-shaped groove GR2 may be formed in the vicinity of the user area AR2 in the address area AR1 on a line of extension of the wobbled land. The groove GR2 is surrounded by the land. The groove GR2 at this time is surrounded by the grooves GR, GR2. A land Y of the address area AR1, positioned on a line of extension of the groove GR in the vicinity of the user area AR2, is surrounded by the grooves GR, GR2. It suffices if the servo circuit 24 generates S/H pulses B when the light beam of the optical head 21 is illuminating the groove and the light beam is positioned in an area C, which is the last position of the address area AR1, as shown in FIG. 13. It suffices if the S/H pulses A are generated at a timing explained with reference to FIG. 11. It is possible in this manner to detect the offset of the area C to remove the offset contained in the push-pull signals generated from the user area AR2.

Figure 14:
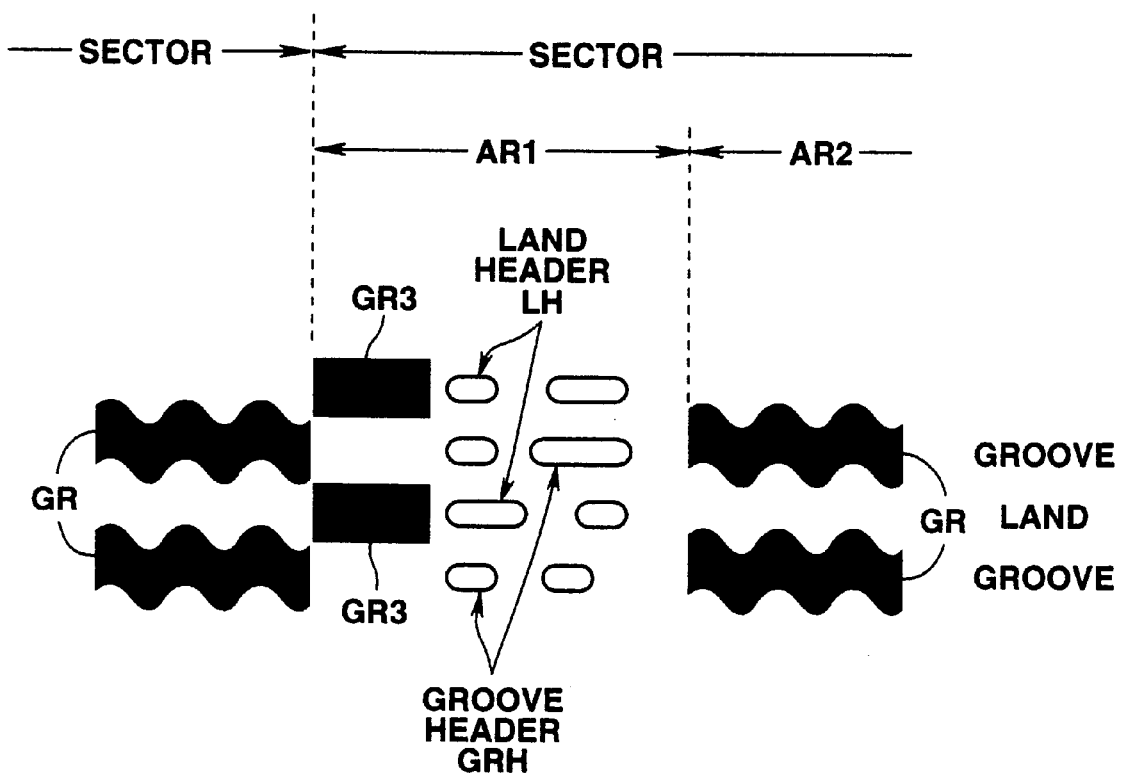
FIG. 14 shows an alternative structure of an address area and a user area of the optical disc.

If the groove header GRH and the land header LH co-exist in the latter half portion of the address area AR1, as shown in FIG. 14, a pit-shaped groove GR3 may be formed on the sector boundary side on a line of extension of the wobbling land. The timing of generating the S/H pulses may be the same as the timing explained with reference to FIG. 11.

As described above, there is no particular limitation to the pit-shaped groove formed in the address area AR1 provided that the groove is on the line of extension of the wobbled land and is adjacent to the pit-shaped groove formed on the line of extension of another land. That is, the pit-shaped groove may be formed in the former half, latter half or intermediate portions of the address area AR1, whichever is desired. In keeping up therewith, it suffices if the servo circuit 24 generates the S/H pulses B when a laser light beam is illuminated on this pit-shaped groove or a land surrounded by two such pit-shaped grooves.

It is thus possible with the recording/reproducing apparatus 20 to remove the dc offset in the push-pull signals to perform data recording/reproduction under correct tracking even if such dc offset is produced.

The address area can be easily detected by detecting the pit-shaped groove or a land surrounded by two such grooves. At this time, it may be attempted to generate more accurate R/W clocks by controlling the timing of detection of the pit-shaped grooves GR1 to a constant value.

The optical disc 1 may, of course, be of a groove recording type or of a land/groove recording type.

What is claimed is:

1. A tracking control apparatus comprising:
   push-pull signal generating means for generating push-pull signals from a detection output obtained by an optical head from an optical disc, said optical disc being formed in terms of a sector made up of an address area and a user area, as a unit, said user area having a meandering groove and a correspondingly meandering land, formed therein, a pit-shaped groove being formed in said address area on a line of extension of said land, said pit-shaped groove being adjacent to another pit-shaped groove formed on a line of extension of another land, said optical head being adapted to illuminate a light beam on said groove or land to detect its reflected light;

pulse generating means for generating a first sample-holding pulse when said light beam is illuminated on said pit-shaped groove or the land surrounded by two such pit-shaped grooves;

first sample-holding means for sample-holding push-pull signals generated by said push-pull signal generating means, in synchronism with said first sample-holding pulses, and for holding the push-pull signals for one sector period;

difference detection means for detecting the difference between the push-pull signals outputted by said sample-holding means and the push-pull signals generated by said push-pull signal generating means; and tracking control means for controlling the tracking of the optical head based on the push-pull signals obtained by said difference detection means.

2. The tracking control apparatus according to claim 1 further comprising:

second sample-holding means for sample-holding the push-pull signals obtained by said difference detection means in synchronism with the second sample-holding pulses and for holding said push-pull signals for a time period during which the light beam is illuminating said address area;

said pulse generating means generating said second sample-holding pulses when said light beam is illuminated directly before the end of said user area of the optical disc;

said tracking control means controlling the tracking of said optical head based on the push-pull signals obtained by said second sample-holding means.

3. A tracking control method comprising:

generating push-pull signals from a detection output obtained by an optical head from an optical disc, said optical disc being formed in terms of a sector, made up of an address area and a user area, as a unit, said user area having a meandering groove and a correspondingly meandering land, formed therein, a pit-shaped groove being formed in said address area on a line of extension of said land, said pit-shaped groove being adjacent to another pit-shaped groove formed on a line of extension of another land, said optical head being adapted to illuminate a light beam on said groove or land to detect its reflected light;

generating a first sample-holding pulse when said light beam is illuminated on said pit-shaped groove or the land surrounded by two such pit-shaped grooves;

sample-holding push-pull signals in synchronism with said first sample-holding pulses;

holding the push-pull signals for one sector period;

detecting the difference between the held push-pull signals and the generated push-pull signals; and controlling the tracking of the optical head based on the push-pull signals detected as to difference.

4. The tracking control method according to claim 3 further comprising:

generating second sample-holding pulses when the light beam is illuminated directly before the end of the user area of said optical disc;

sample-holding push-pull signals, detected as to difference, in synchronism with said second sample-holding pulses;

holding said push-pull signals during a time period during which said light beam is illuminating the address area; and controlling the tracking of said optical head based on the held push-pull signals.

5. A recording/reproducing apparatus comprising:

push-pull signal generating means for generating push-pull signals from a detection output obtained by an optical head from an optical disc, said optical disc being formed in terms of a sector, made up of an address area and a user area, as a unit, said user area having a meandering groove and a correspondingly meandering land, formed therein, a pit-shaped groove being formed in said address area on a line of extension of said land, said pit-shaped groove being adjacent to another pit-shaped groove formed on a line of extension of another land, said optical head being adapted to illuminate a light beam on said groove or land to detect its reflected light;

pulse generating means for generating a first sample-holding pulse when said light beam is illuminated on said pit-shaped groove or the land surrounded by two such pit-shaped grooves;

first sample-holding means for sample-holding push-pull signals generated by said push-pull signal generating means in synchronism with said first sample-holding pulses and for holding the push-pull signals for one sector period;

difference detection means for detecting the difference between the push-pull signals outputted by said sample-holding means and the push-pull signals generated by said push-pull signal generating means;

tracking control means for controlling the tracking of the optical head based on the push-pull signals obtained by said difference detection means, and recording/reproducing means for recording data on said optical disc and/or reproducing data recorded on said optical disc.

6. The recording/reproducing apparatus according to claim 5 further comprising:

second sample-holding means for sample-holding the push-pull signals obtained by said difference detection means in synchronism with the second sample-holding pulses and for holding said push-pull signals for a time period during which the light beam is illuminating said address area;

said pulse generating means generating said second sample-holding pulses when said light beam is illuminated immediately before the end of said user area of the optical disc;

said tracking control means controlling the tracking of said optical head based on the push-pull signals obtained by said second sample-holding means.

* * * * *